United States Patent
Ajima et al.

(10) Patent No.: US 10,983,932 B2
(45) Date of Patent: Apr. 20, 2021

(54) PROCESSOR AND INFORMATION PROCESSING APPARATUS

(71) Applicant: FUJITSU LIMITED, Kawasaki (JP)

(72) Inventors: Yuichiro Ajima, Kawasaki (JP); Shinya Hiramoto, Yokohama (JP); Yuji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/360,069

(22) Filed: Mar. 21, 2019

(65) Prior Publication Data

US 2019/0324927 A1 Oct. 24, 2019

(30) Foreign Application Priority Data

Apr. 19, 2018 (JP) .............................. JP2018-080846

(51) Int. Cl.
*G06F 13/40* (2006.01)
*G06F 13/16* (2006.01)
*G06F 3/06* (2006.01)

(52) U.S. Cl.
CPC ........ *G06F 13/1673* (2013.01); *G06F 3/0604* (2013.01); *G06F 3/0659* (2013.01); *G06F 3/0673* (2013.01); *G06F 13/4027* (2013.01)

(58) Field of Classification Search
CPC .... G06F 3/0604; G06F 3/0659; G06F 3/0673; G06F 13/4027; G06F 13/1673
See application file for complete search history.

(56) References Cited

U.S. PATENT DOCUMENTS 9,003,082 B2 * 4/2015 Okada ..................... G06F 9/546
710/310
9,354,893 B2 * 5/2016 Kobayashi ............ G06F 9/3891
(Continued)

FOREIGN PATENT DOCUMENTS

JP 2012-058958 3/2012
JP 2012-128808 7/2012
(Continued)

OTHER PUBLICATIONS

Fabrizio Petrini et al., "The Case of the Missing Supercomputer Performance: Achieving Optimal Performance on the 8,192 Processors of ASCI Q," The ACM/IEEE Conference on Supercomputing (SC03), 2003 (17 pages).

(Continued)

*Primary Examiner* — Henry Tsai
*Assistant Examiner* — Christopher A Daley
(74) *Attorney, Agent, or Firm* — Fujitsu Patent Center

(57) ABSTRACT

A processor includes: a plurality of processor cores; an interconnector including a reduction operation device and configured to communicate with another processor; a memory controller configured to control a main memory; a bus configured to couple the plurality of processor cores, the interconnector, and the memory controller to each other; and a reduction operation buffer coupled to the bus and the interconnector, wherein each of the processor cores writes control information to control the reduction operation device included in the interconnector and a value to be operated by the reduction operation device in the reduction operation buffer, and the interconnector reads out the control information and the value from the reduction operation buffer and delivers the control information and the value to the reduction operation device.

10 Claims, 4 Drawing Sheets

(56) References Cited

U.S. PATENT DOCUMENTS

| | | | |
|---|---|---|---|
| 9,720,826 B1* | 8/2017 | Adda | H04L 67/2842 |
| 9,753,873 B1* | 9/2017 | Khermosh | G06F 13/26 |
| 10,133,573 B1* | 11/2018 | Eisen | G06F 9/3009 |
| 2003/0058875 A1* | 3/2003 | Arndt | H04L 49/90 370/412 |
| 2009/0007141 A1* | 1/2009 | Blocksome | G06F 9/546 719/315 |
| 2011/0078417 A1* | 3/2011 | Fahs | G06F 9/30087 712/216 |
| 2011/0258245 A1* | 10/2011 | Blocksome | G06F 15/17387 709/201 |
| 2011/0296137 A1* | 12/2011 | Archer | G06F 15/17318 712/16 |
| 2011/0296139 A1* | 12/2011 | Archer | G06F 15/17318 712/30 |
| 2012/0060019 A1 | 3/2012 | Hiramoto et al. | |
| 2012/0159019 A1 | 6/2012 | Inoue et al. | |
| 2012/0159121 A1 | 6/2012 | Inoue et al. | |
| 2014/0222736 A1* | 8/2014 | Drew | G06F 9/5066 706/12 |
| 2015/0039793 A1* | 2/2015 | Rossetti | H04L 49/90 710/105 |
| 2016/0283249 A1 | 9/2016 | Forsell | |
| 2017/0019476 A1* | 1/2017 | Harada | H04L 67/1014 |
| 2018/0285314 A1* | 10/2018 | Higeta | G06F 9/30032 |

FOREIGN PATENT DOCUMENTS

| | | |
|---|---|---|
| JP | 2012-128809 | 7/2012 |
| JP | 2016-534433 | 11/2016 |
| JP | 2017-21618 | 1/2017 |

OTHER PUBLICATIONS

"Unfolding the IBM E-server Blue Gene Solution," IBM Redbooks, pp. 27-29, 2005 (418 pages).

Yuichiro Ajima et al., "The Tofu Interconnects 2", IEEE 22nd Annual Symposium on High Performance Interconnects (HOTI), pp. 57-62, 2014 (6 pages).

* cited by examiner

PROCESSOR AND INFORMATION PROCESSING APPARATUS

CROSS-REFERENCE TO RELATED APPLICATION

This application is based upon and claims the benefit of priority of the prior Japanese Patent Application No. 2018-080846, filed on Apr. 19, 2018, the entire contents of which are incorporated herein by reference.

FIELD

The embodiments discussed herein are related to a processor and an information processing apparatus.

BACKGROUND

In a parallel computation, data are distributed and arranged in plural processors, and a process of aggregating and exchanging the values of the computation results of the respective processors is repeated. Here, in a case where the sum of aggregated values is used in the next process, when the values are summed up during the aggregation, the amount of communication between the processors can be reduced. This parallel process is called a reduction operation. The reduction operation is particularly important in a distributed memory type parallel computer because of the high cost of data transfer between processors.

Related techniques are disclosed in, for example, Japanese Laid-open Patent Publication No. 2017-021618, Japanese National Publication of International Patent Application No. 2016-534433, and Japanese Laid-open Patent Publication Nos. 2012-058958, 2012-128808, and 2012-128809.

Related techniques are disclosed in, for example, "The Case of the Missing Supercomputer Performance: Achieving Optimal Performance on the 8,192 Processors of ASCI Q," Fabrizio Petrini et al., the ACM/IEEE Conference on Supercomputing (SC03), 2003 (Non-Patent Document 1), "Unfolding the IBM E-server Blue Gene Solution," IBM Redbooks, pp. 27-29, 2005 (Non-Patent Document 2), and "The Tofu Interconnect 2," Yuichiro Ajima et al., IEEE 22$^{nd}$ Annual Symposium on High Performance Interconnects (HOTI), 2014 (Non-Patent Document 3).

SUMMARY

According to an aspect of the embodiments, a processor includes: a plurality of processor cores; an interconnector including a reduction operation device and configured to communicate with another processor; a memory controller configured to control a main memory; a bus configured to couple the plurality of processor cores, the interconnector, and the memory controller to each other; and a reduction operation buffer coupled to the bus and the interconnector, wherein each of the processor cores writes control information to control the reduction operation device included in the interconnector and a value to be operated by the reduction operation device in the reduction operation buffer, and the interconnector reads out the control information and the value from the reduction operation buffer and delivers the control information and the value to the reduction operation device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
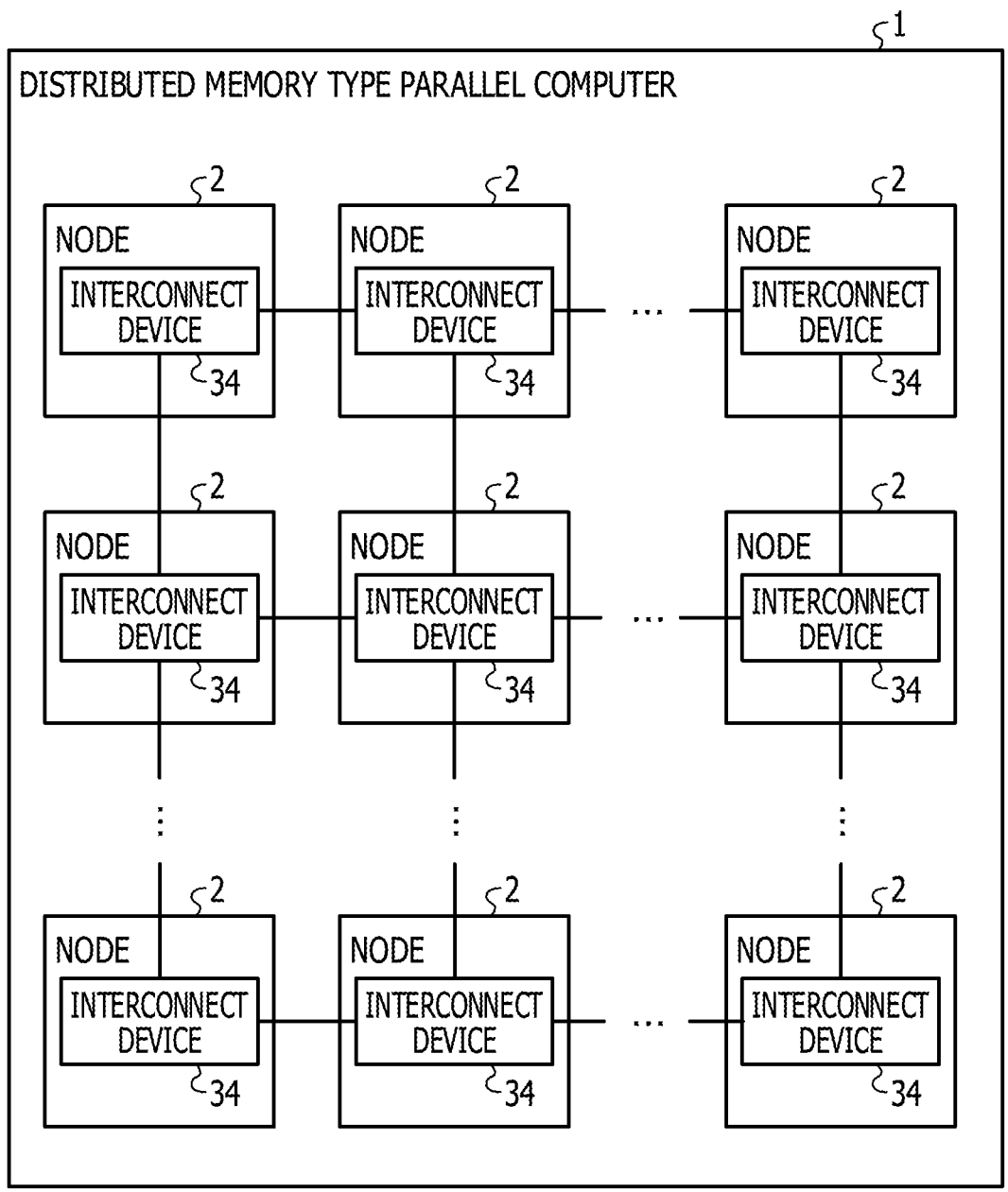
FIG. 1 is a view illustrating the configuration of a distributed memory type parallel computer according to an embodiment.

When the reduction operation is performed with the distributed memory type parallel computer, each processor repeats a communication of microsecond order and a computation of less than microsecond. In addition, in a parallel computer system, a multitasking operating system is running, and each processor forcibly switches tasks at intervals of second order. In the parallel computer system, it takes time of millisecond order until the forcibly switched computation tasks are run again. This overhead is called a system noise. While the system noise does not have a large influence on the computation time of a single processor, catastrophic influence is exerted on the reduction computation.

The influence of the system noise on the reduction operation may be relaxed to some extents by measures such as to reduce the number of system management tasks being run in parallel with a computation task, to process each system management task in a very short time and immediately shift it to a standby state, or the like. However, as long as the multitasking operating system is used and the processor is performing communication and computation processing, it is not fundamentally possible to avoid the influence of the system noise.

Therefore, in many parallel computer systems, a device or circuit dedicated to the reduction operation is mounted on an interconnect device to avoid the influence of the system noise. Here, the interconnect device is a communication device that communicates with another processor. The reduction operation device mounted on the interconnect device is accessed via an IO register of the interconnect device. For example, control information for controlling the reduction operation device and values to be subjected to the reduction operation are delivered to the reduction operation device via the IO register.

There is a technique for reducing the load of data transfer with a file server. In this technique, one of plural information processing apparatuses that perform parallel computation includes a calculation unit, a determination unit, and a transfer unit. The calculation unit calculates the barycentric position of the plural information processing apparatuses based on a first data length, a second data length, and position information of each of the plural information processing apparatuses. Here, the first data length is the length of data which is acquired from each information processing apparatus other than its own information processing apparatus and which is requested the file server to read or write next. The second data length is the length of data that the own information processing apparatus requests the file server to read or write next. The determination unit determines an information processing apparatus that performs data relay from among the plural information processing apparatuses according to the barycentric position. In a case where the information processing apparatus that performs data relay is the own information processing apparatus, the transfer unit aggregates data which is requested to be read or written for a next time by each of the plural information processing apparatuses and transfers the aggregated data with the file server.

Further, in the related art, there is a processor architecture construct for an emulated shared memory architecture. The processor architecture construct includes plural multithread processors each including an interleaved thread-to-thread pipeline and plural functional units for performing arithmetic and logical operations on data. The pipeline includes at least two pipeline branches which are operable in parallel. The first pipeline branch includes a first subgroup of the plural functional units such as Arithmetic Logic Units (ALUs) arranged to perform an integer arithmetic operation. The second pipeline branch includes a second non-overlapping subgroup of the plural functional units such as Floating-Point Units (FPUs) arranged to perform a floating point arithmetic operation. One or more of the functional units of at least the second subgroup arranged for the floating point arithmetic operation are arranged to be operable in parallel with memory access segments of the pipeline.

The processor is composed of a deep pipeline and further includes a buffer for delaying a write of an instruction processing result in a register or a memory. The processor improves a filling rate of the pipeline by exchanging an instruction execution sequence or speculatively executing the subsequent instruction of a branch instruction. When accessing the IO register, the processor needs to guarantee the order of accesses to the memory or the IO register by the processor seen from the outside of the processor.

Therefore, prior to the access to the IO register, the write of the preceding instruction processing result in the CPU (Central Processing Unit) register or the memory is completed. Due to the restriction, the access to the IO register is accompanied by an overhead of stopping the instruction input to the pipeline, which causes a deterioration in the execution performance of the processor. In a case where the processor instructs the interconnect device to perform the reduction operation via the IO register, the access to the IO register with a large overhead is performed plural times (once with control information, once or more with a value), which may result in a deterioration in the execution performance of the processor.

In addition, it may be conceived that a Direct Memory Access (DMA) is used instead of the IO register. For example, the processor writes control information and a value of the reduction operation on a main memory, and then transfers the control information and the value to the interconnect device by the DMA. However, starting the DMA may require a control including an access to the IO register at minimum, which may cause an unavoidable overhead of the DMA starting.

According to an aspect, the deterioration of the execution performance of the processor when control information and a value are delivered to a reduction operation device may be reduced.

Hereinafter, embodiments of a processor and an information processing apparatus of the present disclosure will be described in detail with reference to the accompanying drawings. In the meantime, it should be noted that the embodiments do not limit the technique of the present disclosure.

EMBODIMENTS

The configuration of a distributed memory type parallel computer according to an embodiment will be described first. FIG. 1 is a view illustrating the configuration of a distributed memory type parallel computer according to an embodiment. As illustrated in FIG. 1, a distributed memory type parallel computer 1 according to the embodiment includes plural nodes 2 arranged in a mesh form. For the convenience of description, FIG. 1 represents the nodes 2 that are arranged in two dimensions. However, the nodes 2 may be arranged in higher dimensions such as, for example, three dimensions and six dimensions. Further, the nodes 2 may be arranged in a torus shape.

Each node 2 is an information processing apparatus that performs parallel processing in cooperation with other nodes 2. The node 2 includes an interconnect device 34 and communicates with the nodes 2 disposed above, below, right, and left via the interconnect device 34.

Figure 2:
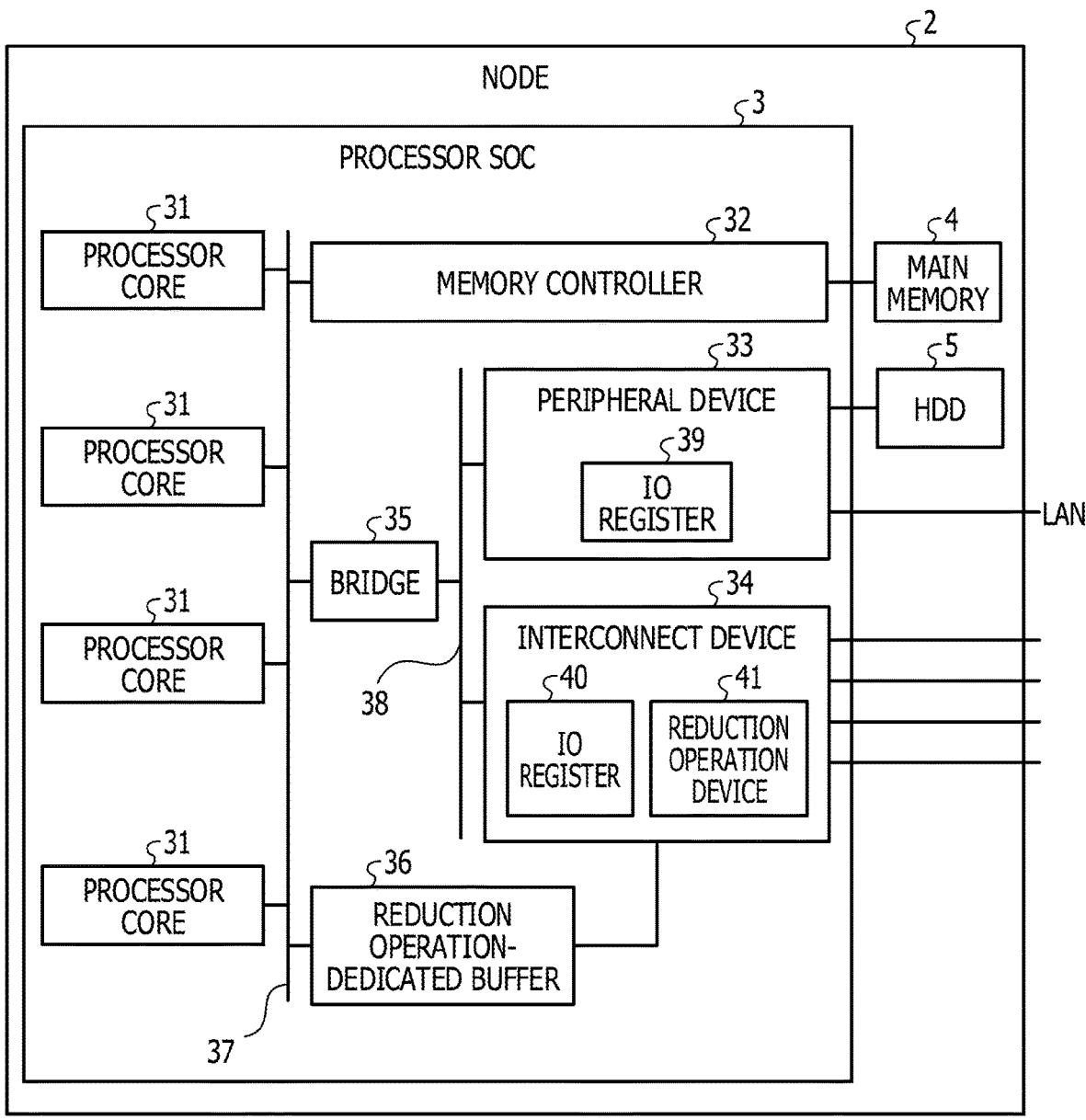
FIG. 2 is a view illustrating the configuration of a node.

FIG. 2 is a view illustrating the configuration of a node 2. As illustrated in FIG. 2, the node 2 includes a processor SoC (System-on-Chip) 3, a main memory 4, and an HDD (Hard Disk Drive) 5. The processor SoC 3 is a processor chip that includes plural processor cores 31. The main memory 4 is a memory that stores, for example, a program or an intermediate result of execution of the program. The HDD 5 is a disk device that stores programs or data.

The processor SoC 3 includes four processor cores 31, a memory controller 32, a peripheral device 33, an interconnect device 34, a bridge 35, and a reduction operation-dedicated buffer 36. In addition, the processor SoC 3 may include 8, 16 or more processor cores 31.

The four processor cores 31, the memory controller 32, the bridge 35, and the reduction operation-dedicated buffer 36 are coupled to each other by a cache coherent bus 37. The bridge 35, the peripheral device 33, and the interconnect device 34 are coupled to each other by a peripheral bus 38.

Each processor core 31 reads and executes a program from the main memory 4. Each processor core 31 includes plural CPU registers. The memory controller 32 is coupled to the main memory 4 and controls reading of programs and data from the main memory 4 and writing of programs and data in the main memory 4.

The peripheral device 33 is an interface that couples to a peripheral device such as the HDD 5. The peripheral device 33 couples to the peripheral device through a LAN (Local Area Network). The peripheral device 33 includes an IO register 39. The processor core 31 accesses the peripheral device 33 by a command to write the contents of the CPU register into the IO register 39 or a command to read the contents of the IO register 39 into the CPU register. The IO register 39 is mapped to an IO space or a memory space of the processor core 31.

The interconnect device 34 communicates with the processor SoCs 3 of the other nodes 2. The interconnect device 34 includes an IO register 40 and a reduction operation device 41. The processor core 31 accesses the interconnect device 34 by a command to write the contents of the CPU register into the IO register 40 or a command to read the contents of the IO register 40 into the CPU register. The IO register 40 is mapped to the IO space or the memory space of the processor core 31.

The reduction operation device 41 performs the reduction operation. The reduction operation includes a total sum, a total product, a total logical sum, a total logical product, the maximum value, and the minimum value. The reduction operation device 41 includes an arithmetic unit that corresponds to each reduction operation.

The processor core 31 used by one user for executing a parallel program is a part of the distributed memory type parallel computer 1. Further, since the reduction operation may be performed by only a part of data divided into the plural processor cores 31 by the parallel program, the reduction operation device 41 has a function to identify a user and a group of reduction operations executed by the user. Here, the part of data divided into the plural processor cores 31 by the parallel program refers to, for example, data of a corresponding row or column of data divided in two dimensions.

Further, the parallel program may perform an iterative processing including the reduction operation. Therefore, in order not to cause a racing where the reduction operations that have been performed before and after destroy data each other, the reduction operation device 41 has a management function to identify the order of the reduction operations and protect data.

When the function of the reduction operation device 41 is used, the user performs the setting of the reduction operation group and the initialization of the reduction operation order in advance, and sets the type of the reduction operation and the identifier of the reduction operation group for each reduction operation. The processor core 31 delivers the type of the reduction operation and the identifier of the reduction operation group as control information together with a value to be subjected to the reduction operation, to the reduction operation device 41.

The bridge 35 couples the cache coherent bus 37 and the peripheral bus 38 to each other. The unit of data transfer of the cache coherent bus 37 is a cache line size between the processor cores 31 and between the processor core 31 and the memory controller 32, and is an IO register size between the processor core 31 and the peripheral device 33. Further, continuous DMA data between the peripheral device 33 and the memory controller 32 are transferred via the cache coherent bus 37.

The reduction operation-dedicated buffer 36 stores the control information and value delivered to the reduction operation device 41 by the processor core 31. The control information and value are transferred from the plural CPU registers of the processor core 31 to the reduction operation-dedicated buffer 36.

For this reason, the processor core 31 have a function of reading the contents of the plural consecutive CPU registers, storing the contents in a buffer, and transferring the contents stored in the buffer to the reduction operation-dedicated buffer 36 via the cache coherent bus 37. In addition, the processor core 31 also has a function of activating this function.

As a method for implementing these functions, there is an extension of an instruction set of the processor core 31. For example, the processor core 31 reads out the contents of the plural consecutive CPU registers, stores the contents in a buffer, and transfers the control information and value by executing an instruction to transfer the contents stored in the buffer to the reduction operation-dedicated buffer 36 via the cache coherent bus 37.

As another method, a memory write command or an IO output command may be used. The processor core 31 transfers the control information and value to the reduction operation-dedicated buffer 36 by performing a memory write in a specific memory space. Alternatively, the processor core 31 transfers the control information and value to the reduction operation-dedicated buffer 36 by performing a write in an IO register of a specific address. The specific address is an address other than the addresses of the IO register 39 and the IO register 40.

Only one CPU register is used in the memory write instruction and the IO output instruction, but plural CPU registers are used to transfer the control information and value. Therefore, when plural memory write instructions or IO output instructions are executed for the plural CPU registers, the processor core 31 temporarily invalidates the function of exchanging an instruction sequence so as not to cause a malfunction.

When a block write instruction in which the contents of the plural CPU registers are written in the main memory 4 by one instruction exists in the instruction, the processor core 31 does not invalidate the function of exchanging the instruction sequence by using the block write instruction.

The reduction operation-dedicated buffer 36 is directly coupled to the interconnect device 34. The control information and value are transferred to the interconnect device 34 all at once from the reduction operation-dedicated buffer 36. The interconnect device 34 receives the control information and value and delivers the control information and value to the reduction operation device 41.

In addition, since the reduction operation device 41 corresponds to plural reduction operation groups, the reduction operation-dedicated buffer 36 holds the number of sets of control information and value corresponding to the reduction operation group. When all the contents of the reduction operation-dedicated buffer 36 are output as signals and connected to the interconnect device 34, the number of signals becomes excessively large.

Therefore, the reduction operation device 41 outputs only one set of control information and value to the interconnect device 34. The interconnect device 34 selects which set of control information and value is to be output. In this way, by outputting only one set of control information and value to the interconnect device 34, it is possible to reduce the number of signal lines output from the reduction operation-dedicated buffer 36 to only one set of control information and value.

Therefore, the interconnect device 34 outputs an address signal for identifying the set of control information and value, and the reduction operation-dedicated buffer 36 inputs the address signal and outputs the corresponding set of control information and value to the interconnect device 34.

Figure 3:
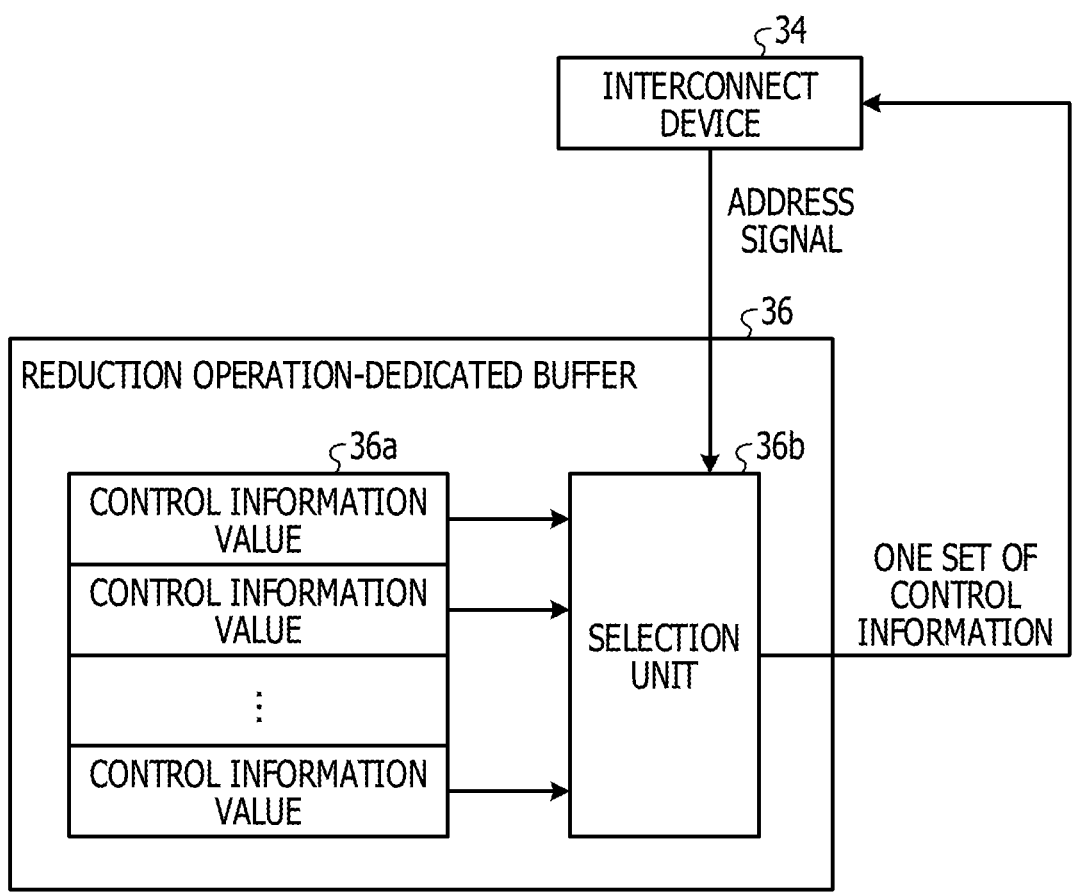
FIG. 3 is a view for explaining selection of a set of control information and a value by an interconnect device.

FIG. 3 is a view for explaining a selection of a set of control information and value by the interconnect device 34. As illustrated in FIG. 3, the reduction operation-dedicated buffer 36 includes a buffer unit 36a and a selection unit 36b. The buffer unit 36a stores plural sets of control information and value. The selection unit 36b selects one set of control information and value from the buffer unit 36a based on an address signal output by the interconnect device 34 and transfers the set of control information and value to the interconnect device 34.

Figure 4:
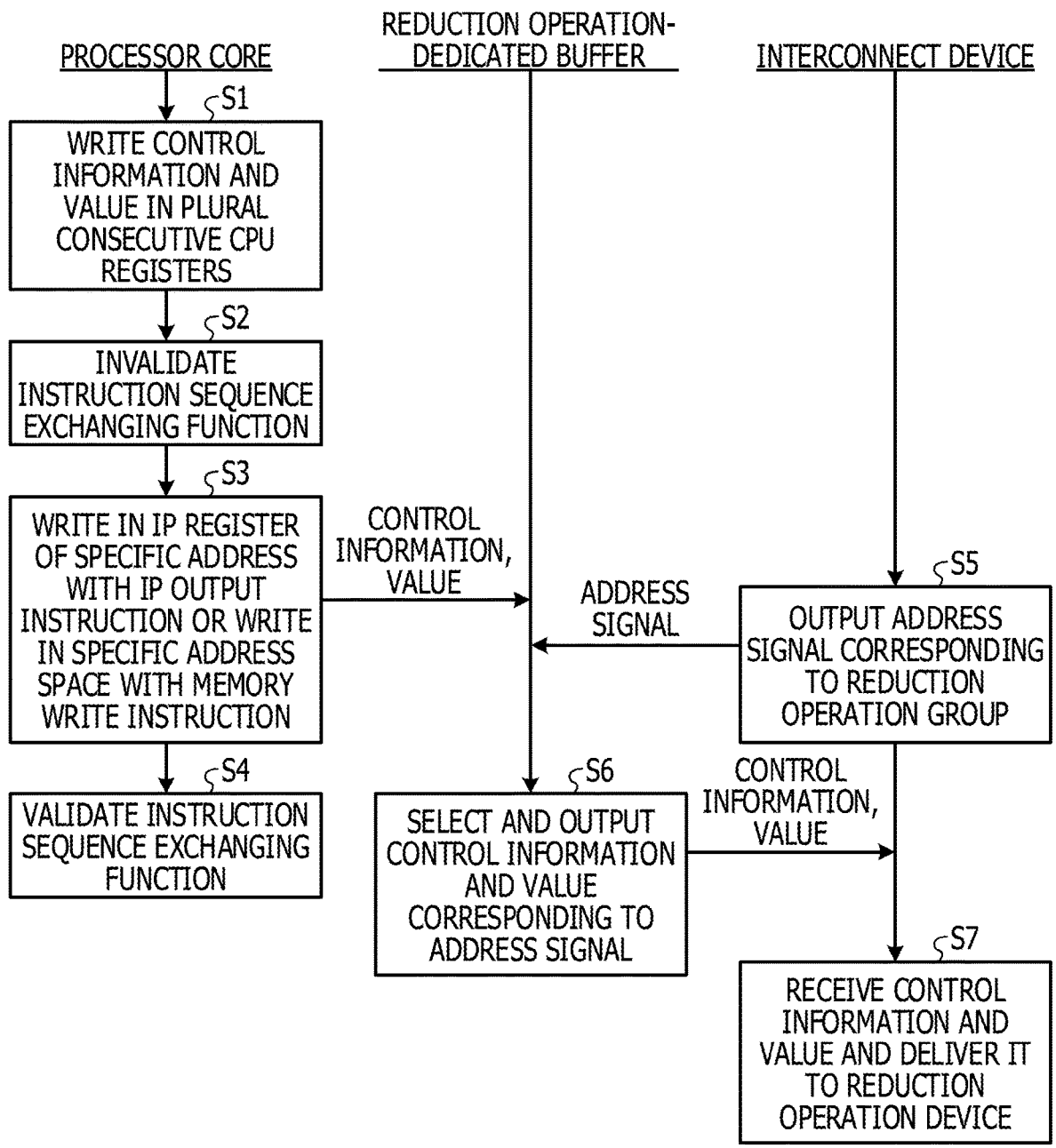
FIG. 4 is a view illustrating a transfer sequence of control information and a value.

Next, a transfer sequence of control formation and value will be described. FIG. 4 is a view illustrating a transfer sequence of control information and value. FIG. 4 illustrates a case where an IO output instruction or a memory write instruction is used. Further, it is assumed that the processor core 31 does not have a block write instruction.

As illustrated in FIG. 4, the processor core 31 writes the control information and value in the plural consecutive CPU registers (step S1), and invalidates the function of exchanging the instruction sequence (step S2). Then, the processor core 31 writes the contents of the plural CPU registers in the IO register of a specific address with the IO output instruction, or writes the contents in a specific address space with the memory write instruction (step S3). As a result, the control information and value are transferred to the reduction operation-dedicated buffer 36. Then, the processor core 31 validates the function of exchanging the instruction sequence (step S4).

Meanwhile, the interconnect device 34 outputs an address signal corresponding to the reduction operation group, to the reduction operation-dedicated buffer 36 (step S5). Then, the reduction operation-dedicated buffer 36 selects and outputs the control information and value corresponding to the address signal to the interconnect device 34 (step S6). Then, the interconnect device 34 receives the control information and value, and delivers the control information and value to the reduction operation device 41 (step S7).

As described above, in the embodiment, the reduction operation-dedicated buffer 36 is coupled to the cache coherent bus 37 and the interconnect device 34. Then, the processor core 31 transfers the control information and value to the reduction operation-dedicated buffer 36. Then, the interconnect device 34 collectively acquires the control information and value from the reduction operation-dedicated buffer 36. Therefore, the processor core 31 may deliver the control information and value to the interconnect device 34 without using the IO register 40, thereby reducing the deterioration of the execution performance.

Further, in the embodiment, the processor core 31 transfers the control information and value to the reduction operation-dedicated buffer 36 by writing the control information and value in the IO register of a specific address with the IO output instruction or writing the control information and value in a specific address space with the memory write instruction. Therefore, the processor core 31 may deliver the control information and value to the reduction operation-dedicated buffer 36 without extending the instruction set.

When the processor core 31 has a dedicated instruction to write the contents of the plural CPU registers to the reduction operation-dedicated buffer 36, the processor core 31 uses the dedicated instruction instead of the IO output instruction or the memory write instruction to write the control information and value in the reduction operation-dedicated buffer 36. In this case, the processor core 31 may readily write the control information and value in the reduction operation-dedicated buffer 36.

In addition, in the embodiment, when the processor core 31 uses the plural memory write instructions to a specific memory space or the plurality IO output instructions to a specific address to write the control information and value in the reduction operation-dedicated buffer 36, the processor core 31 temporarily invalidates the function of exchanging the instruction sequence. Therefore, the processor core 31 may prevent the malfunction of the node 2.

Further, in the embodiment, the reduction operation-dedicated buffer 36 has plural sets of control information and value, and the interconnect device 34 outputs an address signal to the reduction operation-dedicated buffer 36 and acquires a specific set of control information and value. Therefore, the reduction operation device 41 may acquire a set of control information and value corresponding to a specified one of the plural reduction operation groups.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor comprising:
a plurality of processor cores;
an interconnector including a reduction operation device and configured to communicate with another processor;
a memory controller configured to control a main memory;
a bus configured to couple the plurality of processor cores, the interconnector, and the memory controller to each other; and
a reduction operation buffer coupled to the bus and the interconnector,
each of the processor cores writes control information to control the reduction operation device included in the interconnector and a value to be operated by the reduction operation device in the reduction operation buffer without going through the interconnector, and the interconnector reads out the control information and the value from the reduction operation buffer and delivers the control information and the value to the reduction operation device.

2. The processor according to claim 1, wherein each of the processor cores uses a dedicated instruction to write the control information and the value in the reduction operation buffer.

3. The processor according to claim 1, wherein each of the processor cores uses a memory write instruction directed to a specific memory space or an IO output instruction directed to a specific address to write the control information and the value in the reduction operation buffer.

4. The processor according to claim 3, wherein each of the processor cores temporarily invalidates a function of exchanging an instruction sequence when using a plurality of memory write instructions directed to a specific memory space or a plurality of IO output instructions directed to a specific address to write the control information and the value in the reduction operation buffer.

5. The processor according to claim 1, wherein the reduction operation buffer has a plurality of sets of the control information and the value, and the interconnector designates an address of a set of the control information and the value to be read, and reads out the control information and the value from the reduction operation buffer.

6. An information processing apparatus comprising:
a processor; and
a main memory configured to store a program to be executed by the processor,
the processor includes:
a plurality of processor cores;
an interconnector including a reduction operation device and configured to communicate with a processor of another information processing apparatus;
a memory controller configured to control the main memory;
a bus configured to couple the plurality of processor cores, the interconnector, and the memory controller to each other; and
a reduction operation buffer coupled to the bus and the interconnector, each of the processor cores writes control information to control the reduction operation device included in the interconnector and a value to be operated by the reduction operation device in the reduction operation buffer without going through the interconnector, and the interconnector reads out the control information and the value from the reduction operation buffer and delivers the control information and the value to the reduction operation device.

7. The information processing apparatus according to claim 6, wherein each of the processor cores uses a dedicated instruction to write the control information and the value in the reduction operation buffer.

8. The information processing apparatus according to claim 6, wherein each of the processor cores uses a memory write instruction directed to a specific memory space or an IO output instruction directed to a specific address to write the control information and the value in the reduction operation buffer.

9. The information processing apparatus according to claim 8, wherein each of the processor cores temporarily invalidates a function of exchanging an instruction sequence when using a plurality of memory write instructions directed to a specific memory space or a plurality of IO output instructions directed to a specific address to write the control information and the value in the reduction operation buffer.

10. The information processing apparatus according to claim 6, wherein the reduction operation buffer has a plurality of sets of the control information and the value, and the interconnector designates an address of a set of the control information and the value to be read, and reads out the control information and the value from the reduction operation buffer.

* * * * *